(12) United States Patent
Radic et al.

(10) Patent No.: US 7,477,906 B2
(45) Date of Patent: Jan. 13, 2009

(54) METHODS AND APPARATUS FOR FACILITATING THE DETERMINATION OF GPS LOCATION INFORMATION FOR A MOBILE STATION WITHOUT DISRUPTING COMMUNICATIONS OF A VOICE CALL

(75) Inventors: Slaven Radic, Ottawa (CA); Xin Jin, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 157 days.

(21) Appl. No.: 10/789,571

(22) Filed: Feb. 27, 2004

(65) Prior Publication Data

US 2005/0197137 A1    Sep. 8, 2005

(51) Int. Cl.
*H04Q 7/20* (2006.01)
(52) U.S. Cl. .............. 455/456.2; 455/456.1; 455/404.2; 342/357.1; 342/357.07; 342/357.13; 701/213; 701/216; 379/1
(58) Field of Classification Search .......... 455/404.1–2, 455/456.1–456.6; 342/357.01, 357.06–7, 342/15; 340/988, 991, 993, 539.13; 379/45
See application file for complete search history.

(56) References Cited

U.S. PATENT DOCUMENTS

| | | | | |
|---|---|---|---|---|
| 5,736,962 A * | 4/1998 | Tendler | .................... | 342/357.1 |
| 5,873,040 A * | 2/1999 | Dunn et al. | ............... | 455/456.2 |
| 6,002,936 A * | 12/1999 | Roel-Ng et al. | .......... | 455/456.4 |
| 6,266,533 B1 * | 7/2001 | Zadeh et al. | ............. | 455/456.2 |
| 6,313,787 B1 * | 11/2001 | King et al. | ............. | 342/357.03 |
| 6,397,074 B1 * | 5/2002 | Pihl et al. | ................. | 455/456.2 |
| 6,400,314 B1 * | 6/2002 | Krasner | .................. | 342/357.09 |
| 6,411,811 B2 * | 6/2002 | Kingdon et al. | .......... | 455/456.5 |
| 6,477,362 B1 * | 11/2002 | Raith et al. | .............. | 455/404.1 |
| 6,477,363 B1 * | 11/2002 | Ayoub et al. | .............. | 455/404.2 |

(Continued)

FOREIGN PATENT DOCUMENTS

EP    1182896 A1    2/2002

(Continued)

OTHER PUBLICATIONS

"European Search Report for Application 04251112.1", Jul. 20, 2004.

(Continued)

*Primary Examiner*—Sharad Rampuria
(74) *Attorney, Agent, or Firm*—John J. Oskorep, Esq.

(57) ABSTRACT

Methods and apparatus for facilitating the determination of Global Positioning System (GPS) location information for a mobile station without disrupting communications of a voice call (e.g. a 911 emergency call). In one illustrative example, the mobile station causes GPS navigational-type data to be regularly or periodically received and stored in memory prior to the voice call. At some point in time, the mobile station receives a voice call request to initiate the voice call. In response, the mobile station derives GPS assistance data based on the GPS navigational-type data. The mobile station then causes a GPS fix to be performed using the GPS assistance data, to thereby obtain GPS measurement data. Thereafter, the mobile station causes the voice call to be established and maintained through the wireless network. The GPS measurement data is transmitted to a location server for calculating the location of the mobile station.

33 Claims, 6 Drawing Sheets

U.S. PATENT DOCUMENTS

| | | | |
|---|---|---|---|
| 6,625,458 B2 * | 9/2003 | Pihl et al. | 455/456.1 |
| 6,677,894 B2 * | 1/2004 | Sheynblat et al. | 342/357.1 |
| 6,760,582 B2 * | 7/2004 | Gaal | 455/423 |
| 6,861,982 B2 * | 3/2005 | Forstrom et al. | 342/387 |
| 6,907,238 B2 * | 6/2005 | Leung | 455/404.1 |
| 6,941,147 B2 * | 9/2005 | Liou | 455/456.5 |
| 6,944,464 B2 * | 9/2005 | Muranaga | 455/456.1 |
| 7,009,948 B1 * | 3/2006 | Carlsson et al. | 370/329 |
| 7,177,623 B2 * | 2/2007 | Baldwin | 455/404.2 |
| 2002/0097181 A1 | 7/2002 | Chou et al. | |
| 2002/0098849 A1 * | 7/2002 | Bloebaum et al. | 455/456 |
| 2002/0111171 A1 | 8/2002 | Boesch et al. | |
| 2003/0146871 A1 * | 8/2003 | Karr et al. | 342/457 |
| 2005/0075116 A1 * | 4/2005 | Laird et al. | 455/456.3 |

FOREIGN PATENT DOCUMENTS

| | | | |
|---|---|---|---|
| EP | 1298448 A1 * | 4/2003 | |
| EP | 1720030 A1 * | 11/2006 | |
| WO | WO 0034800 A1 * | 6/2000 | |

OTHER PUBLICATIONS

"Z. Biacs, G. Marshall, M. Moeglein, W. Riley", "The Qualcomm/Snap Track Wireless-Assisted GPS Hybrid Positioning System and Results From Initial Commercial Deployments".

"Qualcomm CDMA Technologies", "MS-Based GPSONE(tm) Operation in DMSS", Jun. 2003, pp. 1-51, Qualcomm, San Diego, CA.

European Search Report for Application # 07106453.9, Dated Jun. 1, 2007.

* cited by examiner

METHODS AND APPARATUS FOR FACILITATING THE DETERMINATION OF GPS LOCATION INFORMATION FOR A MOBILE STATION WITHOUT DISRUPTING COMMUNICATIONS OF A VOICE CALL

BACKGROUND

1. Field of the Invention

The present invention relates generally to wireless communications involving mobile stations, and more particularly to methods and apparatus for facilitating the determination of Global Positioning System (GPS) location information of a mobile station without disrupting voice communications of a voice call.

2. Description of the Related Art

Present-day wireless communication devices, such as cellular telephones or mobile stations, are capable of making and receiving voice calls and/or sending and receiving data through wireless communication networks. Fairly recent developments have given such mobile stations the ability to communicate Global Positioning System (GPS) location information which is indicative of the exact location of the mobile station. To reduce cost and complexity at the mobile station, this may be done using the same RF transceiver utilized for typical voice and data communications (or by sharing at least a portion thereof) without the need for a completely separate GPS transceiver (i.e. separate hardware).

Among the adopted position location technologies for Enhanced 911 (E911), Assisted GPS (A-GPS) is one of the solutions. For current Code Division Multiple Access (CDMA) systems, such GPS techniques are described in standard specification documents such as TIA/EIA/IS-801-1 of November 2000. During a voice call involving the mobile station, real-time GPS location information may be obtained and sent to a receiving entity. To obtain real-time GPS location information, the mobile station receives the signals from a GPS system as well as communicates with a location server in the wireless communication network. The location server may include a Position Determination Entity (PDE) which has a GPS receiver for wirelessly receiving information from the GPS system. The mobile station obtains GPS acquisition assistance data and uses it to perform what is referred to as a "GPS fix" during a voice call. During the GPS fix, the mobile station tunes to a GPS frequency different from the traffic channel of the voice call in order to obtain GPS pseudorange data from the GPS system. The mobile station obtains the GPS pseudorange data by measuring GPS signal delays at the mobile. After the GPS fix, the mobile station retunes back to the traffic channel of the voice call. Sometime during the voice call, the mobile station sends the GPS pseudorange data to the location server which calculates the location of the mobile station based on it. The location server/PDE may send the location of the mobile station to the receiving entity (e.g. 911 emergency center or PSAP) or, if received by the mobile station, the mobile station may send the location of the mobile station to the receiving entity.

Note that the mobile station may have to tune away from the voice call anywhere between about 300 milliseconds to 2 seconds, for example. As apparent, voice communications of the voice call are undesirably disrupted with use of the conventional procedure. Also, the conventional procedure undesirably increases the chances of the voice call being dropped. The processes also cause power control variations that can reduce system capacity. In the case where the voice call is very important, such as the 911 emergency call, these issues are of great concern.

Accordingly, there is a resulting need for methods and apparatus for facilitating the determination of GPS location information for a mobile station without disrupting voice communications of a voice call so as to overcome the deficiencies of the prior art.

SUMMARY

Methods and apparatus for facilitating the determination of Global Positioning System (GPS) location information for a mobile station without disrupting communications of a voice call (e.g. a 911 emergency call) are described herein.

In one illustrative example, the mobile station causes GPS navigational-type data to be regularly or periodically received through a wireless receiver and stored in memory prior to the voice call. At some point in time, the mobile station receives, through a user interface, a voice call request to initiate the voice call through a wireless communication network. Upon receiving the voice call request, the mobile station derives GPS assistance data based on the stored GPS navigational-type data. Next, the mobile station causes, with use of the wireless receiver, a GPS fix to be performed with a GPS system using the GPS assistance data. The mobile station obtains GPS measurement data based on GPS signals received during the GPS fix and stores this data in memory. Thereafter, the mobile station causes the voice call to be established and maintained through the wireless communication network. The GPS measurement data is then transmitted from the mobile station to a location server in the wireless communication network for calculating the location of the mobile station. Thereafter, the location server may send the location information to the requesting entity or, alternatively, the location server may send the location information to the mobile station which sends it to the requesting entity. Advantageously, the mobile station is operative to refrain from causing the GPS fix to be performed during the voice communications of the voice call so that the communications are not disrupted.

In another illustrative example, the mobile station again maintains a voice call (e.g. a 911 emergency call) through a wireless communication network. At some point in time, the mobile station identifies a trigger signal indicative of a request to terminate the voice call from the end user. In response to identifying the trigger signal, the mobile station causes a GPS fix to be performed, with use of a wireless receiver, with the GPS system using GPS assistance data. The mobile station obtains GPS measurement data based on GPS signals received during the GPS fix. The GPS measurement data is then transmitted from the mobile station to a location server in the wireless communication network for calculating the location of the mobile station. The location server may send the location to a recipient device or, alternatively, the location server may send the location to the mobile station which then sends it to the recipient device. The mobile station then causes the voice call to be terminated. Using this method, the mobile station is again operative to refrain from causing the GPS fix to be performed during the voice communications of the voice call so that the communications are not disrupted.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for facilitating the determination of Global Positioning System (GPS) location information for a mobile station without disrupting communications of a voice call (e.g. a 911 emergency call) are disclosed. In one illustrative example, the mobile station causes GPS navigational-type data to be regularly or periodically received through a wireless receiver and stored in memory prior to the voice call. At some point in time, the mobile station receives, through a user interface, a voice call request to initiate the voice call through a wireless communication network. In response, the mobile station calculates GPS assistance data based on the stored GPS navigational-type data. The mobile station then causes a GPS fix to be performed with a GPS system using the GPS assistance data. The mobile station obtains GPS measurement data based on GPS signals received with the wireless receiver during the GPS fix. Thereafter, the mobile station causes the voice call to be established and maintained through the wireless communication network. The GPS measurement data is then transmitted from the mobile station to a location server in the wireless communication network for calculating the location of the mobile station. Thereafter, the location server may send the location to the requesting entity or, alternatively, the location server may send the location to the mobile station which then sends it to the requesting entity. Advantageously, the mobile station is operative to refrain from causing the GPS fix to be performed during the voice communications of the voice call so that the communications are not disrupted.

Figure 1:
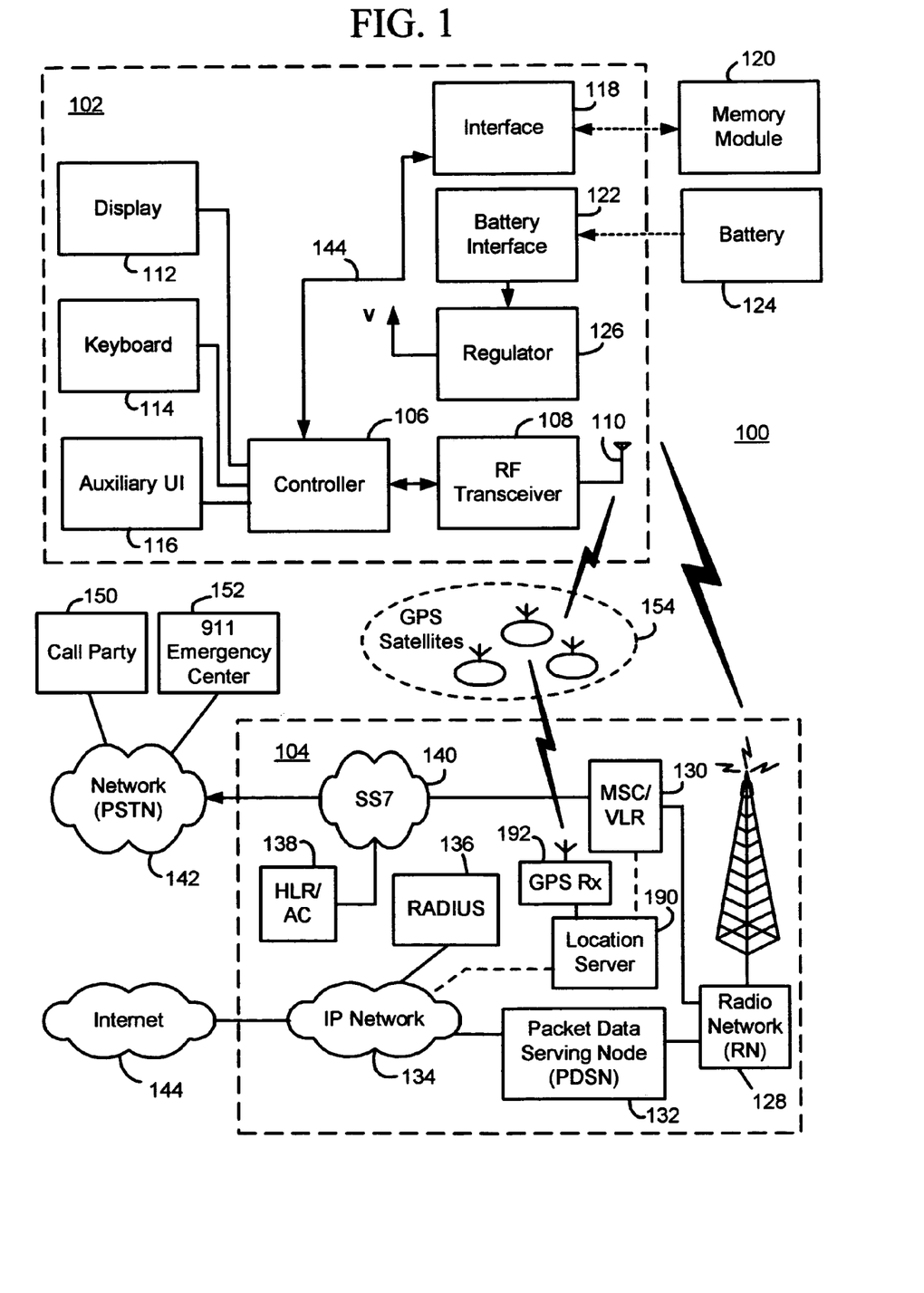
FIG. 1 is a block diagram which illustrates pertinent components of a wireless communication network and a mobile station which communicates with this network as well as with a Global Positioning System (GPS)

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into a non-volatile memory of mobile station 102. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116. Controller 106 is either embodied as the computer's CPU or a separate CPU within the modem unit. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Second Generation (2G) or Third Generation (3G) supported network based on Code Division Multiple Access (CDMA) technologies. In particular, wireless network 104 is a CDMA2000® network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN) which may connect mobile station 102 with other call parties such as a call party 150 (e.g. a landline telephone or other mobile station) or an emergency call center 152. On the other hand, IP network 134 is communicatively coupled to another network 144 such as the Internet. Note that CDMA2000® is a registered trademark of the Telecommunications Industry Association (TIA-USA).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 includes position tracking components for tracking the locations of mobile stations. Location information of mobile stations is obtained based on Global Positioning System (GPS) techniques utilizing GPS satellites of a conventional GPS system 154. In the typical configuration, GPS system 154 includes twenty-four (24) GPS satellites that circle the earth every twelve (12) hours. In the present application, mobile station 102 obtains GPS information based on signals received from GPS system 154 and utilizes a location server 190 in wireless network 104 to measure and obtain its location. Location server 190 is connected to MSC 130 and/or IP network 134 and may include what is referred to as a Position Determination Entity (PDE). The PDE is coupled to a GPS receiver 192 for receiving signals and decoding information transmitted by GPS system 154. Note that mobile station 102 can receive GPS information from GPS system 154 and location server 190 using the same RF transceiver 108 utilized for typical voice and data communications (or by sharing at least a portion thereof). Thus, a separate GPS receiver is not utilized in mobile station 102 for receiving GPS information from GPS system 154.

Among the currently adopted position location technologies for Enhanced 911 (E911), Assisted GPS (A-GPS) is one of the solutions. Such GPS techniques are described in standard specification documents such as TIA/EIA/IS-801-1 of November 2000. During a voice call involving mobile station 102, real-time GPS location information may be obtained and sent to a receiving entity. To obtain the GPS location information, mobile station 102 operates with GPS system 154 as well as location server 190 in wireless communication network 104. Conventionally, mobile station 102 obtains GPS acquisition assistance data and uses it to perform what is referred to as a "GPS fix" during a voice call. For the GPS fix, mobile station 102 tunes to a GPS signal frequency of GPS system 154 which is different from the traffic channel frequency of the voice call. During the GPS fix, mobile station 102 performs GPS pseudorange measurements based on GPS signals received from GPS system 154. After the GPS fix, mobile station 102 retunes back to the traffic channel of the voice call. Sometime during the voice call mobile station 102 sends the GPS pseudorange data to location server 190, which derives the location of mobile station 102 based on it. Location server/PDE 190 may send this location information to the receiving entity and/or to mobile station 102. If received by the mobile station, mobile station 102 may send the location information to the receiving entity. Note that, using the conventional method, mobile station 102 may have to tune away from the voice call one or more times and, for each time, from anywhere between 300 milliseconds to 2 seconds, for example. As apparent, voice communications of the voice call are undesirably disrupted with use of the conventional procedure. Also, the conventional procedure undesirably increases the chance that the voice call will be dropped. The processes also cause power control variations that can reduce system capacity. In the case where the voice call is very important, such as the 911 emergency call, these issues are of great concern. In accordance with teachings of the present application as described in more detail in relation to FIGS. 3-4, however, these issues can be alleviated.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
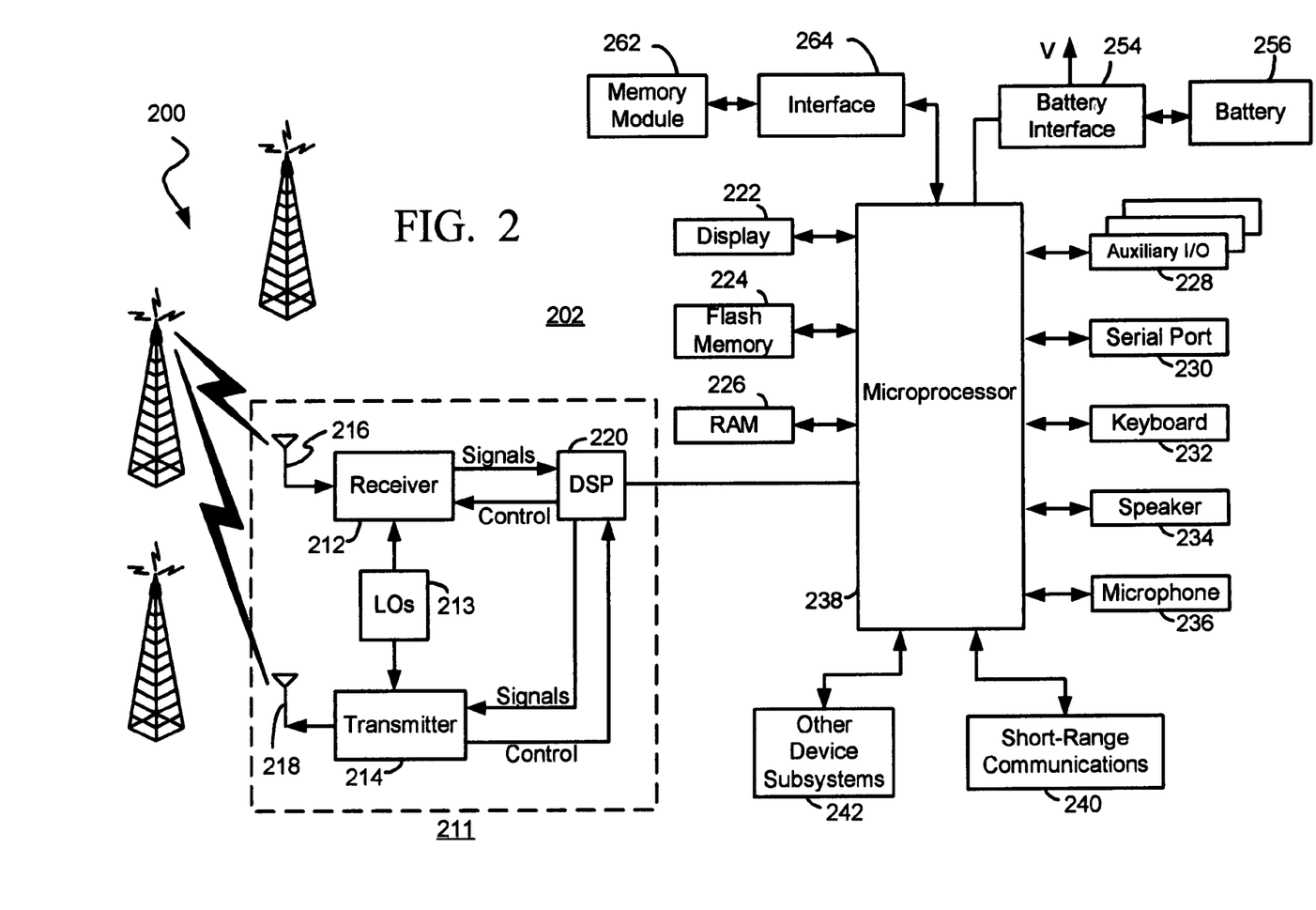
FIG. 2 is a more detailed diagram of the mobile station which may communicate within the wireless communication network.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with, as will be described in more detail later in relation to FIGS. 3 and 4.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, a portion of the non-volatile memory or flash memory 224 is programmed with configuration data by a service provider so that mobile station 202 may operate in the network. Since mobile station 202 is a portable battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) which provides power to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications (such as a network re-establishment scheme), will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG.

Figure 3:
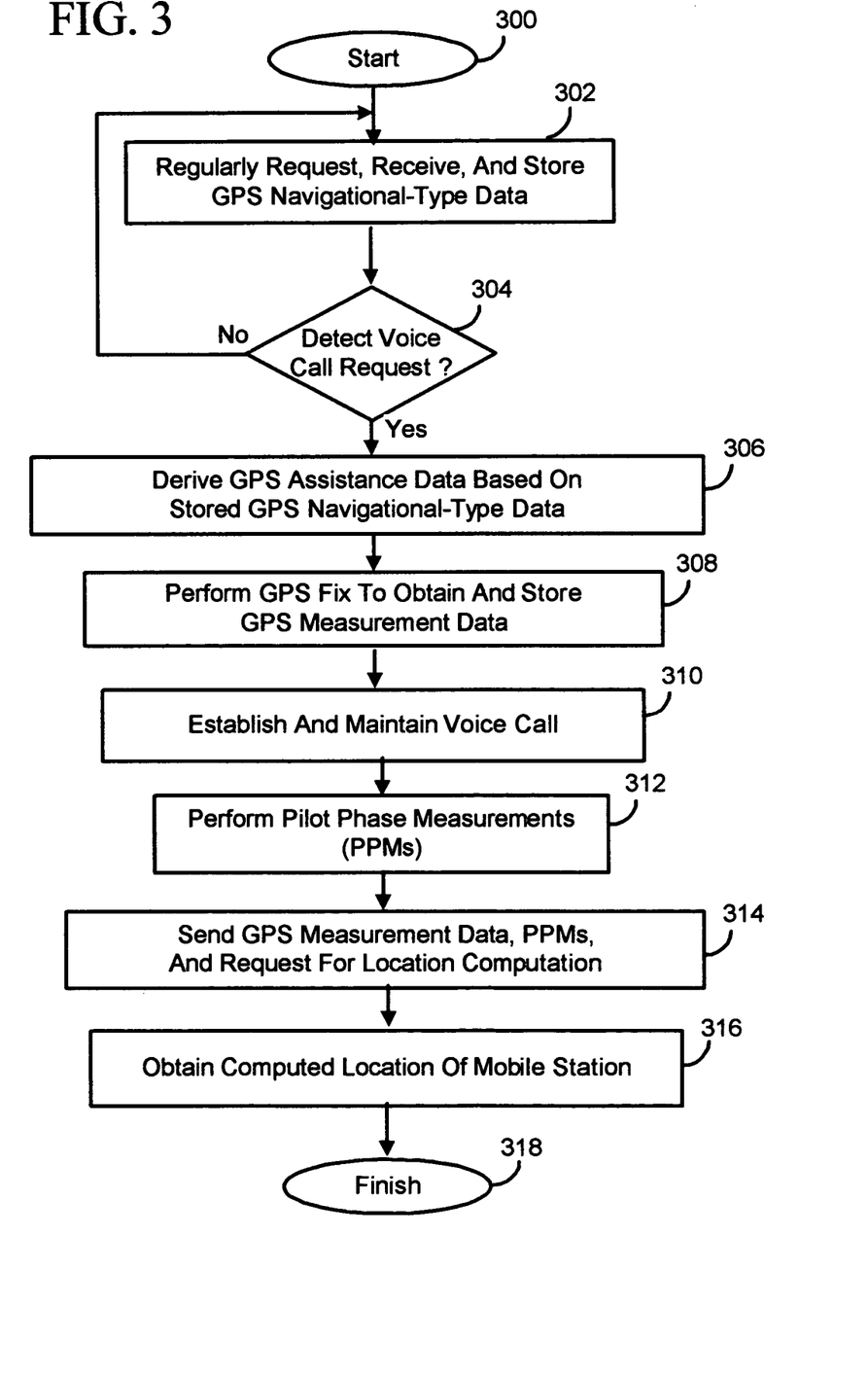
FIG. 3 is a flowchart for use in describing a method of facilitating the determination of GPS location information for the mobile station without disrupting communications of a voice call (e.g. a 911 emergency voice call) involving the mobile station.
Figure 4:
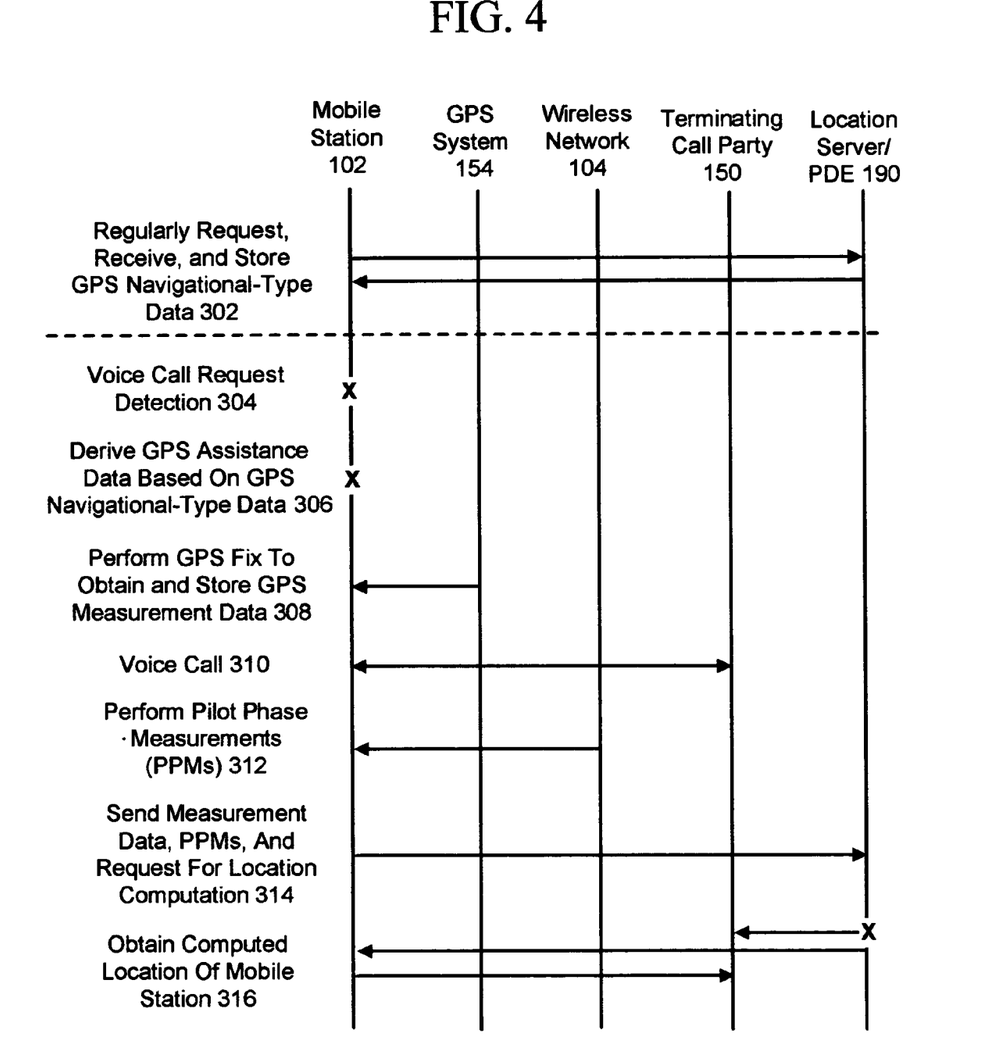
FIG. 4 is a system flow diagram for use in describing the method associated with FIG. 3.

FIG. 3 is a flowchart for use in describing a method of facilitating the determination of Global Positioning System (GPS) location information for a mobile station without disrupting voice communications of a voice call (e.g. a 911 emergency call) involving the mobile station. Related in FIG. 4 is a system flow diagram for use in describing the method. The method may be performed by a mobile station in connection with pertinent system components as described, using one or more processors, memory, and its RF transceiver (e.g. see FIGS. 1-2). The method may further be embodied in a computer program product which includes a computer storage medium (e.g. memory or computer disk) having computer instructions stored therein which are executable by one or more processors (e.g. a microprocessor) of the mobile station. In the following description, FIGS. 3 and 4 will be referred to in combination.

Beginning at a start block 300 of FIG. 3, the processor of mobile station 102 causes GPS navigational-type data to be regularly or periodically requested, received, and stored in memory of mobile station 102 during its idle mode of operation (step 302 of FIGS. 3-4). Note that during typical idle mode operation, no voice call is being maintained nor is a traffic channel established between mobile station 102 and wireless communication network 104 (except for that utilized in connection with the receipt of the GPS navigational-type data through the wireless network as will be described below). The regular or periodic requesting, receiving, and storage of GPS navigational-type data may be performed once every 30 minutes to 4 hours, for example, or for shorter or longer intervals if suitable.

The GPS navigational-type data may be "raw" navigational data or, alternatively, data derived from the raw navigational data which may include GPS ephemeris parameter data and/or GPS almanac parameter data. Hence the term, "navigational-type" data. The GPS navigational-type data may be received from location server 190 through the wireless network or, alternatively, directly from GPS system 154. Preferably, mobile station 102 regularly or periodically requests and receives downloads of the GPS ephemeris data and/or GPS almanac data from location server 190. To do this, mobile station 102 may have to send location server 190 information related to its coarse location as indicated by pilot phase measurements (PPMs). Thus, PPMs may also be regularly or periodically performed by mobile station 102 at the time the mobile station sets up traffic channel for requesting GPS navigational-type data from location server 190. The PPM data are sent to location server 190 together with the request for downloading GPS navigational-type data. Note that location server/PDE 190 utilizes a triangulation/trilateration procedure based on the PPMs to obtain the coarse location of mobile station 102 in order to derive the GPS acquisition assistance information for mobile station 102. Alternatively, the longitude and latitude of the serving base station(s) that may be available from broadcasted messages from the base station(s) may be used as the coarse location for location server/PDE 190 to derive the GPS acquisition assistance information for mobile station 102.

During the idle mode, the processor of mobile station 102 also monitors to identify from the user interface whether a voice call request is detected (step 304 of FIGS. 3-4). This step 304 may include monitoring to identify a potential voice call request within an upcoming foreseeable time period which is relatively short (e.g. within a few seconds of time). The detection of the voice call request may be based on one or more specific actions taken at the user interface by the end user. For example, the detection may be based on the end user invoking or starting a phone application, prior to entering or dialling a phone number. As another example, the detection may be based on the end user entering telephone digits or the telephone number of the voice call, which may include the actuation or selection of the SEND or ENTER key of the user interface. As even another example, the detection may be based on the end user removing the mobile station from a holster or a battery-charging unit for placing the voice call. Other triggering conditions include the end user powering up the mobile station. If the mobile station functions as a modem utilized by a personal computer (PC) or laptop, the triggering may occur from an application on the PC or laptop. Even further, the detection may include a combination of two or more of the above trigger mechanisms.

If the voice call request is not detected at step 302, then the mobile station continues such monitoring. If the voice call request is detected at step 302, the processor of mobile station 102 performs a GPS procedure for obtaining GPS location information. In particular, the processor of mobile station 102 derives GPS acquisition assistance data and/or sensitivity assistance data based on the last previous GPS navigational-type data received and stored in memory (step 306 of FIGS. 3-4). GPS acquisition assistance data includes data that identifies the appropriate surrounding GPS satellites (e.g. in the form of PseudoRandom Noise or "PRN" code numbers), Doppler frequencies, and time delay window information. Sensitivity assistance data includes predicted bit contents of the GPS navigational data that will be modulated onto the GPS signals at the time the GPS fix is going to be performed. Next, the processor of mobile station 102 causes a GPS fix to be performed with GPS system 154 (step 308 of FIGS. 3-4). During the GPS fix, the wireless receiver of mobile station 102 is tuned to a GPS frequency to receive GPS signals from GPS system 154. Mobile station 102 obtains GPS measurement data associated with mobile station 102 based on the GPS signals received from GPS system 154. The GPS measurement data may be or include GPS pseudorange data. Note that no call-setup procedures for the voice call have yet been performed. The time it takes to perform the GPS fix with the wireless receiver may vary but it is preferably no more than a few seconds, e.g. between about 300 milliseconds to 1 second, so that the end user does not experience a noticeable delay in connecting the call.

Thereafter, the processor of mobile station 102 causes the voice call to be established and maintained for the end user of mobile station 102 (step 310 of FIGS. 3-4). During the voice call, a traffic channel is maintained between mobile station 102 and wireless network 154 so that voice communications may take place between the end user of mobile station 102 and terminating call party 150. Terminating call party 150 is associated with a telephone number which may have been selected by the end user of mobile station 102. Terminating call party 150 may be any ordinary call party (e.g. family, friend, or colleague of the end user) or, alternatively, an emergency call center associated with "911" or other emergency telephone number such as a Public Safety Answering Point (or PSAP). Note that the GPS fix of step 308 occurs prior to the actual setup of the traffic channel and voice communications of the voice call in step 310.

Sometime during the voice call, the processor of mobile station 102 causes pilot phase measurements (PPMs) to be obtained from base station signals of wireless network 104 (step 312 of FIGS. 3-4). Unlike the PPMs that may be performed at step 302, PPMs obtained at step 312 are not for purpose of providing the coarse location of mobile station 102, but rather for use in combination with pseudoranges to enhance location accuracy when the available GPS pseudoranges alone are not sufficient for determining the location accurately. Performing PPMs at steps 312 (as well as sending PPMs in step 314 described below) may be optional in this technique.

Next, the processor of mobile station 102 causes the PPMs, GPS measurement data, and a request for location determination to be sent to location server or PDE 190 (step 314 of FIGS. 3-4). The sending of the GPS measurement data may be performed in response to a request from location server 190 or other requesting entity, or autonomously by the mobile station 102 (e.g. triggered by the dialled phone number such as an emergency number like "911"). Next, location server/PDE 190 computes the location of mobile station 102 based on a triangulation/trilateration technique using the GPS pseudorange data and/or PPM data (step 316 of FIGS. 3-4). The location information of the mobile station may be or include latitude, longitude, and altitude information. Location server 190 may send the resulting location information of mobile station 102 directly to terminating call party 150 with or without its request. Alternatively, location server 190 may send the location information to mobile station 102, which may send in turn to terminating call party 190. The flowchart of FIG. 3 ends at a finish block 318.

As apparent from the method of FIGS. 3-4, mobile station 102 is operative to refrain from causing the GPS fix to be performed during voice communications of a voice call so that communications are not disrupted. When a mobile station has to tune away from the voice call to perform the GPS fix in accordance with the conventional procedure, voice communications of the voice call are disrupted. In addition, the conventional procedure increases the chance that the voice call will be undesirably dropped. The conventional process also causes power control variations that can reduce system capacity. In the case where the voice call is very important, such as a 911 emergency call, these issues are of great concern.

In one variation associated with the method of FIGS. 3-4, the GPS procedure in steps 306, 308, 312, 314, and 316, or steps 312, 314, and 316, are performed only for predetermined telephone numbers and/or upon predetermined actions taken at the user interface by the end user. For example, the GPS procedure may be performed only for emergency calls (e.g. a 911 telephone number) but no others. If steps 306 and 308 are performed, and when the phone number is not intended for location determination, the obtained and stored GPS pseudorange measurement data is discarded. As another example, the GPS procedure may be performed only for those telephone numbers of a prestored list in memory of the mobile station but not for all other telephone numbers. The prestored list may be configurable by the end user and/or dealer, and may or may not include a 911 emergency telephone number. If this approach is taken, the processor of the mobile station compares the selected telephone number with the one or more telephone numbers in the prestored list to make its determination. In yet another variation, the visual display of the mobile station may display a prompt "SEND LOCATION INFORMATION?" for the end user to respond "YES" or "NO". If the end user selects YES, the location information is sent; if the end user selects NO, the location information is not sent. Note that, if the location information is displayed in the visual display, the end user may orally communicate this displayed location information during the voice call to any terminating call party (e.g. an emergency dispatch officer such as a Public Safety Answering Point or PSAP operator).

A related method of the present application is based on a triggering signal where the end user takes action to terminate the voice call. This related method may be performed subsequent to, or as an alternative to, the method described in relation to FIGS. 3-4. The related method will now be described in relation to a flowchart of FIG. 5 and a system flow diagram of FIG. 6. Beginning at a start block of FIG. 5, a voice call is established and maintained between mobile station 102 and terminating call party 150 (step 502 of FIGS. 5-6). Terminating call party 150 is associated with a telephone number which may have been selected by the end user of mobile station 102. Terminating call party 150 may be any ordinary call party (e.g. family, friend, or colleague) or, alternatively, an emergency call center associated with "911" or other emergency telephone number. When the voice call is established, a traffic channel is setup between the mobile station and the network.

Figure 5:
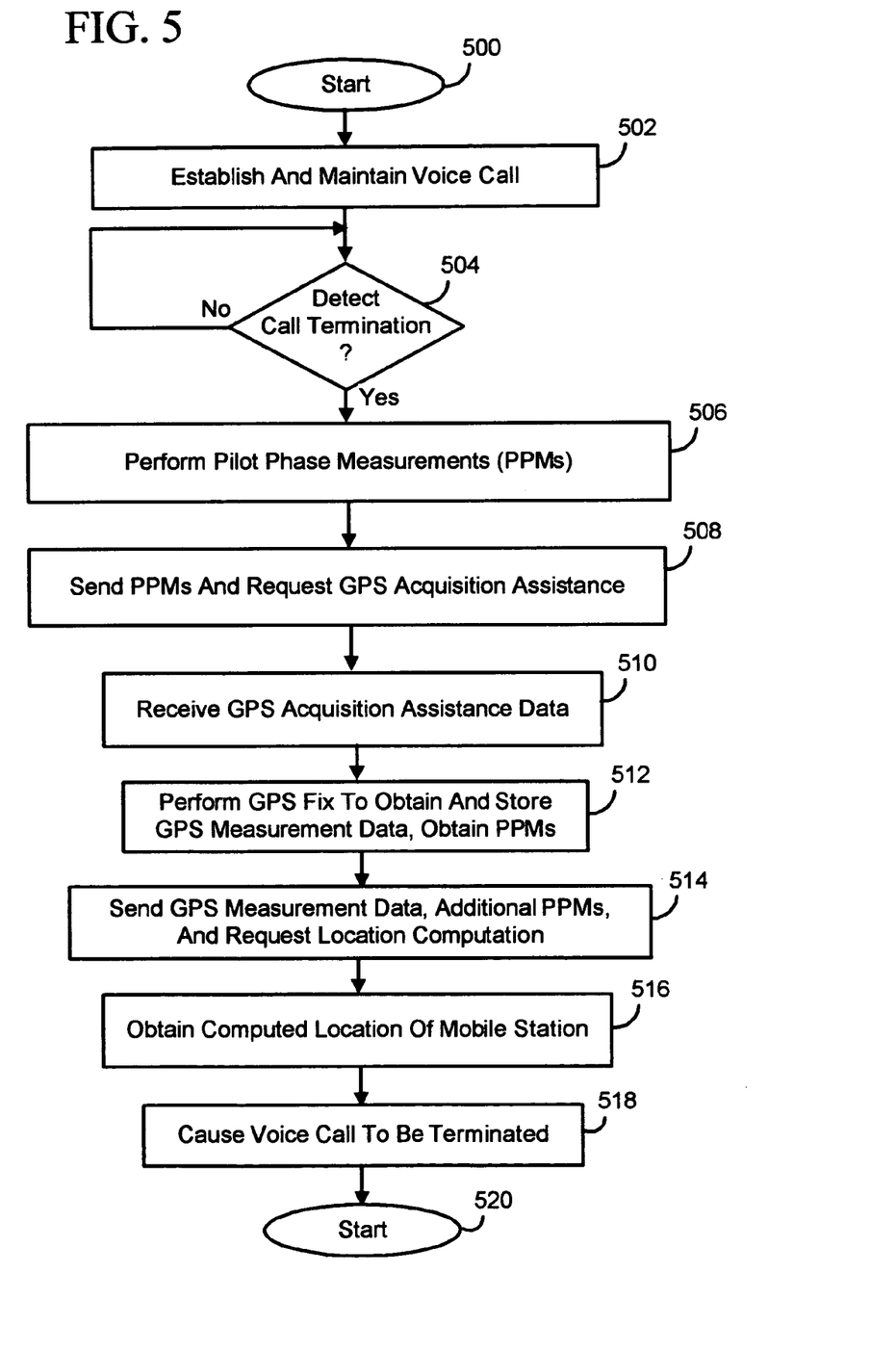
FIG. 5 is a flowchart for use in describing another method of facilitating the determination of GPS location information for the mobile station without disrupting communications of a voice call (e.g. a 911 emergency voice call) involving the mobile station.
Figure 6:
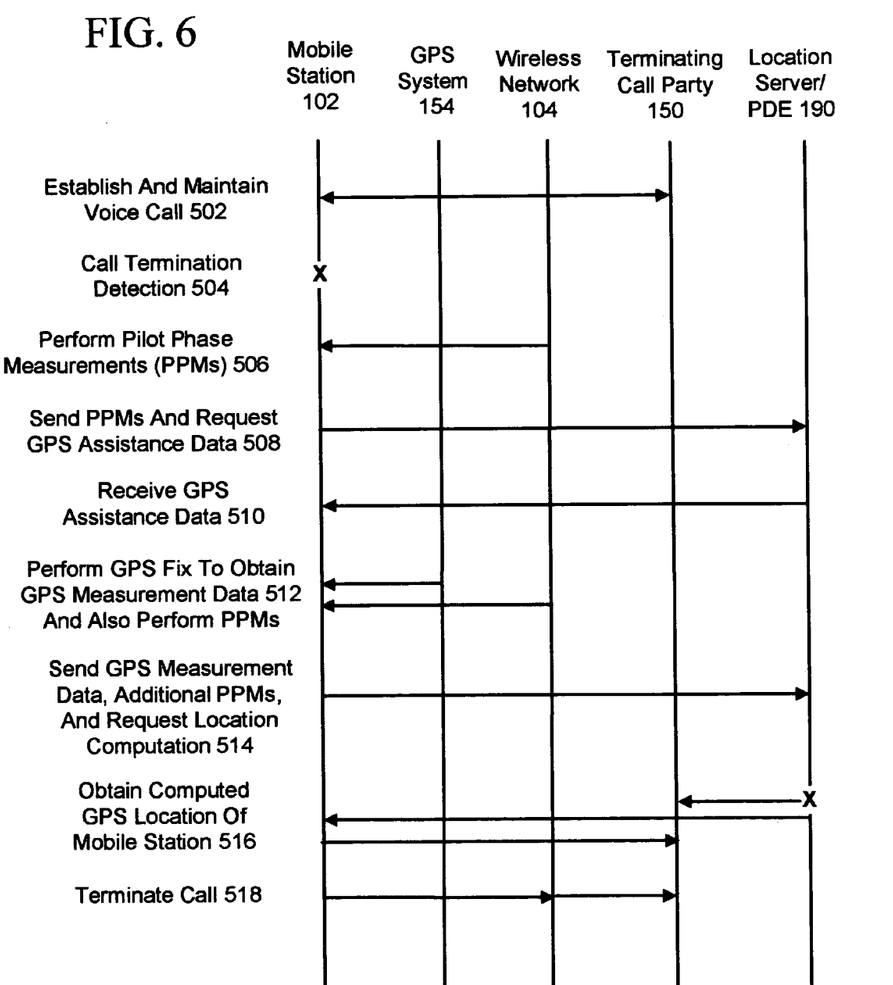
FIG. 6 is a system flow diagram for use in describing the method associated with FIG. 5.

The voice call is maintained for voice communications until the processor of mobile station 102 detects a request to terminate the call (step 504 of FIGS. 5-6). The request to terminate the voice call may be made by the end user of mobile station 102 through the user interface, for example. In response to the request to terminate the call, the processor of mobile station 102 immediately causes a GPS procedure to be performed. In particular, the processor of mobile station 102 causes pilot phase measurements (PPMs) to be obtained from wireless network 104 (step 506 of FIGS. 5-6). PPMs provide an indication of the coarse location of mobile station 102 which may be optional for this technique; other data such as broadcasted serving base station location data may be utilized as an alternative if needed. Next, the processor of mobile station 102 causes the PPMs (or the coarse location information of mobile station 102) and a request for GPS assistance data to be sent to location server 190 (step 508 of FIGS. 5-6). In response, mobile station 102 receives GPS acquisition assistance data from location server 190 through the wireless network (step 510 of FIGS. 5-6). GPS acquisition assistance data includes data that identifies the appropriate surrounding GPS satellites (e.g. in the form of PseudoRandom Noise or "PRN" code numbers), Doppler frequencies, and time delay window information. The GPS acquisition assistance data may be in the form of GPS ephemeris data and/or GPS almanac data.

Next, the processor of mobile station 102 causes a GPS fix to be performed with GPS signals from GPS system 154 and also perform PPM (step 512 of FIGS. 5-6). Note that although the voice call is still maintained, voice communications between the parties have ended. During the GPS fix, the wireless receiver of mobile station 102 is tuned to a GPS system frequency to receive signals from GPS system 154. The GPS measurement data may be or include GPS pseudorange data. The time it takes to perform the GPS fix with the wireless receiver may vary between about 300 milliseconds to 2 seconds. The processor of mobile station 102 may then optionally request sensitivity assistance data and reperform the GPS fix with use of the sensitivity assistance data, if needed.

The processor of mobile station 102 then causes the received GPS measurement data, additional PPMs, and a request for location computation to be sent to location server 190 having the PDE (step 514 of FIGS. 5-6). The sending of the GPS measurement data may be performed in response to a request from location server 190 or other requesting entity. Next, location server/PDE 190 computes the location associated with mobile station 102 based on a triangulation/trilateration technique using the GPS measurement data and/or the PPM data (step 516 of FIGS. 5-6). The location information of mobile station 102 may be or include latitude, longitude, and altitude information. Location server 190 may send the location information of mobile station 102 directly to terminating call party 150 with or without its request. Alternatively, location server 190 may send the location information to mobile station 102 which receives it for communication to terminating call party 190 with or without its request. Once the location information has been computed, the processor of mobile station 102 causes the voice call to be terminated (step 518 of FIGS. 5-6). The flowchart of FIG. 5 ends at a finish block 520.

As apparent from the method of FIGS. 5-6, mobile station 102 is operative to refrain from causing the GPS fix to be performed during voice communications of a voice call so that voice communications are not disrupted. When a mobile station has to tune away from the voice call to perform the GPS fix in accordance with the conventional procedure, voice communications of the voice call are disrupted. In addition, the conventional procedure increases the chance that the voice call will be undesirably dropped. The conventional process also causes power control variations that can reduce system capacity. In the case where the voice call is very important, such as a 911 emergency call, these issues are of great concern.

In one variation associated with the method of FIGS. 5-6, the GPS procedure in steps 506-518 is performed only for predetermined telephone numbers and/or upon predetermined actions taken at the user interface by the end user. For example, the GPS procedure may be performed only for emergency calls (e.g. a 911 telephone number) but no others. As another example, the GPS procedure may be performed only for those telephone numbers of a prestored list in memory of the mobile station but not for all other telephone numbers. The prestored list may be configurable by the end user and/or dealer, and may or may not include a 911 emergency telephone number. If this approach is taken, the processor of the mobile station compares the selected telephone number with the one or more telephone numbers in the prestored list to make its determination. In yet another variation, the visual display of the mobile station may display a prompt "SEND LOCATION INFORMATION?" for the end user to respond "YES" or "NO". If the end user selects YES, the location determination procedures are performed; if the end user selects NO, the location determination procedures are not performed.

In an alternative embodiment, all steps in FIGS. 3-6 involving PPMs are not utilized. In another alternative embodiment, steps 314 and 316 in FIGS. 3-4 and steps 514 and 516 in FIGS. 5-6 are not performed, but rather mobile station 102 computes the location of the mobile station based on GPS measurement data and/or PPM data. In yet another embodiment, location server/PDE 190 is not utilized; rather, mobile station 102 directly decodes GPS navigational-type data from signals of GPS system 154 periodically or regularly in the idle mode at step 302 of FIGS. 3-4, performs stand-alone GPS pseudorange measurement at step 308 of FIGS. 3-4, and computes its own location based on the GPS pseudorange measurement data at step 316; steps 312 and 314 of FIGS. 3-4 are not performed.

The description above used a CDMA wireless network as an example, which has the advantage that the mobile station gets accurate GPS time easily from the wireless network. However, the method and system can also be used in connection with other suitable wireless networks.

Final Comments. Methods and apparatus for facilitating the determination of GPS location information for a mobile station without disrupting communications of a voice call (e.g. a 911 emergency call) have been described. In one illustrative example, the mobile station causes GPS navigational-type data to be received through a wireless receiver and stored in memory prior to voice communications of a voice call involving the mobile station. The mobile station then receives, through a user interface, a voice call request for the voice call through a wireless communication network. After receiving the voice call request, the mobile station derives GPS assistance data based on the stored GPS navigational-type data. The mobile station then causes, with use of the wireless receiver, a GPS fix to be performed with signals from a GPS system using the derived GPS assistance data. The mobile station obtains GPS measurement data based on signals from the GPS system. Thereafter, the mobile station causes the voice call to be established and maintained for the mobile station through the wireless communication network. The GPS measurement data is then transmitted from the mobile station to a location server in the wireless communication network for calculating the location of the mobile station. As apparent, the mobile station is operative to refrain from causing the GPS fix to be performed during the voice communications of the voice call so that the communications are not disrupted.

In another illustrative example, the mobile station again maintains a voice call (e.g. a 911 emergency call) through a wireless communication network. At some point in time, the mobile station identifies a trigger signal indicative of a request to terminate the voice call. In response to identifying the trigger signal, the mobile station causes a GPS fix to be performed, with use of a wireless receiver, with the GPS system using GPS assistance data. The mobile station obtains GPS measurement data based on signals from the GPS system. The GPS measurement data is then transmitted from the mobile station to a location server in the wireless communication network for calculating the location of the mobile station. The location server may send the location information to a recipient device or, alternatively, the location server may send the location information to the mobile station which then sends it to the recipient device. The mobile station then causes the voice call to be terminated. Using this method, the mobile station is again operative to refrain from causing the GPS fix to be performed during the voice communications of the voice call so that the communications are not disrupted.

The above-described embodiments of the present application are intended to be examples only. Those of skill in the art may effect alterations, modifications and variations to the particular embodiments without departing from the scope of the application. Note that the location information may be included and sent in any suitable message, such as a TeleType (TTY) message. Apart from GPS, for course, other satellite-based systems may exist and be used according to the present application, such as Global Navigation Satellite System (GLONASS), etc. The invention described herein in the recited claims intends to cover and embrace all such changes in technology.

What is claimed is:

1. In a mobile station, a method of facilitating the determination of Global Positioning System (GPS) location information without disrupting voice communications of a voice call involving the mobile station comprising the acts of:
   causing GPS navigational-type data to be received, via a wireless communication network, through a wireless transceiver of the mobile station and stored in memory of the mobile station;
   receiving, through a user interface of the mobile station, a voice call request for establishing a voice call;
   in response to the receiving of the voice call request:
      deriving GPS assistance data based on the GPS navigational-type data that was received and stored prior to the voice call request;
      tuning the wireless transceiver away from the wireless communication network to a GPS frequency to receive signals from a GPS system through the wireless transceiver;
      prior to establishing the voice call, causing a GPS fix to be performed with the signals from the GPS system through the wireless transceiver using the GPS assistance data to thereby obtain GPS measurement data;
      after the GPS fix is performed, retuning the wireless transceiver to signals of the wireless communication network, and causing the voice call for the voice call request to be established and maintained for the mobile station through the same wireless communication network and with the same wireless transceiver used to receive the GPS navigational-type data; and
      during the voice call, causing the GPS measurement data and a request for calculating a location of the mobile station to be transmitted to a location server in the wireless communication network for calculating the location of the mobile station based on the GPS measurement data.

2. The method of claim 1, wherein the voice call comprises a 911 emergency call.

3. The method of claim 1, wherein the act of causing the GPS navigational-type data to be received and stored in memory of the mobile station comprises the further acts of regularly causing the GPS navigational-type data to be received and stored in the memory during one or more time periods that the mobile station would have otherwise been in an idle mode of operation.

4. The method of claim 1, wherein the act of causing the GPS navigational-type data to be received comprises the further act of causing the GPS navigational-type data to be received from the location server.

5. The method of claim 1, further comprising:
   identifying a trigger signal indicative of the voice call request at the mobile station; and
   wherein the act of identifying the trigger signal includes at least one of the following: identifying a detection of the mobile station being taken out of a holster, identifying a selection of a phone application of the mobile station, identifying a selection of one or more digits of a telephone number for the voice call, identifying a selection of entry of the telephone number for the voice call, and receiving the trigger signal from a personal computer (PC) or laptop.

6. The method of claim 1, further comprising:
   identifying a phone number of the voice call; and
   wherein the act of causing the GPS fix to be performed is contingent on the phone number of the voice call.

7. The method of claim 1, wherein the GPS navigational-type data comprises GPS ephemeris data and/or GPS almanac data.

8. The method of claim 1, wherein the GPS assistance data comprises at least one of: GPS satellite PseudoRandom Noise (PRN) code identifying data, Doppler frequency data, time delay window data, and bit contents of the GPS navigational data.

9. The method of claim 1, wherein the GPS measurement data comprises GPS pseudorange data.

10. The method of claim 1, wherein the location server includes a Position Determination Entity (PDE).

11. The method of claim 1, further comprising:
   receiving the location of the mobile station from the location server through the wireless communication network.

12. The method of claim 1, further comprising:
   refraining from causing a GPS fix to be performed during the voice communications of the voice call.

13. The method of claim 1, wherein the wireless communication network comprises a CDMA network and the wireless transceiver comprises a CDMA transceiver.

14. A mobile station, comprising:
   a user interface;
   a wireless receiver and transmitter;
   one or more processors coupled to the wireless receiver and transmitter;
   memory coupled to the one or more processors;
   the one or more processors being operative to facilitate the determination of Global Positioning System (GPS) location information of the mobile station by:

causing GPS navigational-type data to be received, via a wireless communication network, through the wireless receiver and stored in the memory;

receiving, through the user interface, a voice call request for establishing a voice call;

in response to the receiving of the voice call request:
deriving GPS assistance data based on the GPS navigational-type data that was received and stored prior to the voice call request;

tuning the wireless receiver away from the wireless communication network to a GPS frequency to receive signals from a GPS system through the wireless receiver;

prior to establishing the voice call: causing, with use of the wireless receiver, a GPS fix to be performed with the signals from the GPS system using the GPS assistance data to thereby obtain GPS measurement data based on signals from the GPS system;

after the GPS fix is performed: retuning the wireless receiver to signals of the wireless communication network and causing, with use of the wireless receiver and transmitter, the voice call for the voice call request to be established and maintained for the mobile station through the same wireless communication network and with the same wireless receiver used to receive the GPS navigational-type data; and causing, during the voice call with use of the wireless transmitter, the GPS measurement data and a request for calculating a location of the mobile station to be transmitted to a location server in the wireless communication network for calculating the location of the mobile station based on the GPS measurement data.

15. The mobile station of claim 14, wherein the voice call comprises a 911 emergency call.

16. The mobile station of claim 14, wherein the causing of the GPS navigational-type data to be received and stored in the memory is performed on a regular basis during one or more time periods that the mobile station would have otherwise been in an idle mode of operation.

17. The mobile station of claim 14, wherein the causing of the GPS navigational-type data to be received comprises causing the GPS navigational-type data to be received from the location server through the wireless communication network.

18. The mobile station of claim 14, further comprising:
identifying a trigger signal indicative of the voice call request at the mobile station; and
wherein the act of identifying the trigger signal includes at least one of the following: identifying a detection of the mobile station being taken out of the holster, identifying a selection of a phone application of the mobile station, identifying a selection of one or more digits of a telephone number for the voice call, identifying a selection of entry of the telephone number for the voice call, and receiving the trigger signal from a personal computer (PC) or laptop.

19. The mobile station of claim 14, wherein the one or more processors are further operative to:
identify a phone number of the voice call; and
wherein the act of performing the GPS fix is contingent on the phone number of the voice call.

20. In a mobile station, a method of facilitating the determination of Global Positioning System (GPS) location information without disrupting voice communications of a voice call which is maintained for the mobile station via a wireless communication network using a wireless transceiver, the method comprising the acts of:
identifying, through a user interface of the mobile station, a trigger signal indicative of a request to terminate the voice call for ending the voice communications of the voice call;

in response to identifying the trigger signal indicative of the request to terminate the voice call:
tuning the wireless transceiver away from the wireless communication network to a GPS frequency to receive signals from a GPS system through the wireless transceiver;
causing a GPS fix to be performed with the signals from the GPS system using GPS assistance data to thereby obtain GPS measurement data;
after the GPS fix, retuning the wireless transceiver to signals of the wireless communication network, and causing the GPS measurement data and a request for calculating a location of the mobile station to be transmitted through the wireless transceiver to a location server in the wireless communication network, for calculating the location of the mobile station based on the GPS measurement data; and
causing the voice call to be terminated, responsive to the trigger signal indicative of the request to terminate the voice call, for ending the voice communications of the voice call.

21. The method of claim 20, wherein the voice call comprises a 911 emergency call.

22. The method of claim 20, further comprising:
causing the GPS assistance data to be received in response to identifying the trigger signal.

23. The method of claim 20, further comprising:
refraining from causing a GPS fix to be performed during the voice communications of the voice call.

24. The method of claim 20, wherein the wireless transceiver comprises a CDMA transceiver.

25. The method of claim.20, further comprising:
identifying a phone number of the voice call; and
wherein the acts of causing a GPS fix and causing the GPS measurement data to be transmitted before ending the voice call is contingent on the phone number for the voice call.

26. The method of claim 20, wherein the trigger signal is based on an actuation of an END key.

27. A mobile station, comprising:
a user interface;
a wireless receiver and transmitter;
one or more processors coupled to the wireless receiver and transmitter;
memory coupled to the one or more processors;
the one or more processors being operative to facilitate the determination of Global Positioning System (GPS) location information for the mobile station without disrupting voice communications of a voice call which is maintained for the mobile station via a wireless communication network using the wireless receiver and transmitter by:
identifying, through the user interface, a trigger signal indicative of a request to terminate the voice call for ending the voice communications of the voice call;
in response to identifying the trigger signal indicative of the request to terminate the voice call:

tuning the wireless receiver away from the wireless communication network to a GPS frequency to receive signals from a GPS system through the wireless receiver;

causing a GPS fix to be performed with the signals from the GPS system using GPS assistance data, to thereby obtain GPS measurement data;

after the GPS fix, retuning the wireless transceiver to signals of the wireless communication network, and causing the GPS measurement data and a request for calculating a location of the mobile station to be transmitted through the wireless transceiver to a location server in the wireless communication network, for calculating the location of the mobile station based on the GPS measurement data; and causing the voice call to be terminated, responsive to the trigger signal indicative of the request to terminate the voice call, for ending the voice communications of the voice call.

28. The mobile station of claim 27, wherein the voice call comprises a 911 emergency call.

29. The mobile station of claim 27, wherein the one or more processors are further operative for:

causing the GPS assistance data to be received in response to identifying the trigger signal.

30. The mobile station of claim 27, wherein the one or more processors are further operative for:

refraining from causing a GPS fix to be performed during the voice communications of the voice call.

31. The mobile station of claim 27, wherein at least a portion of the same wireless receiver is utilized for performing the GPS fix and maintaining the voice call.

32. The mobile station of claim 27, wherein the one or more processors are further operative for:

identifying a phone number of the voice call; and wherein the acts of causing the GPS fix and causing the GPS measurement data to be transmitted before ending the voice call is contingent upon the phone number for the voice call.

33. The mobile station of claim 27, wherein the trigger signal is based on an actuation of an END key at the user interface.

* * * * *